US010666727B2

(12) United States Patent
Mala et al.

(10) Patent No.: US 10,666,727 B2
(45) Date of Patent: May 26, 2020

(54) DISTRIBUTED PROCESSING NETWORK OPERATIONS

(71) Applicant: Intel Corporation, Santa Clara, CA (US)

(72) Inventors: Praveen Mala, Hillsboro, OR (US); Iosif Gasparakis, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 19 days.

(21) Appl. No.: 15/465,254

(22) Filed: Mar. 21, 2017

(65) Prior Publication Data
US 2018/0278683 A1 Sep. 27, 2018

(51) Int. Cl.
H04L 29/08 (2006.01)

(52) U.S. Cl.
CPC .................. H04L 67/1095 (2013.01)

(58) Field of Classification Search
CPC ..... H04L 67/1095; H04L 45/24; H04L 49/15; H04L 69/16; H04L 49/30
See application file for complete search history.

(56) References Cited

U.S. PATENT DOCUMENTS

| 7,562,110 | B2* | 7/2009 | Miloushev | G06F 16/1824 709/201 |
| 2005/0182905 | A1* | 8/2005 | McGlew | G06F 12/0888 711/139 |
| 2012/0130950 | A1* | 5/2012 | Jain | G06F 16/184 707/634 |
| 2012/0158672 | A1* | 6/2012 | Oltean | G06F 16/13 707/692 |
| 2013/0266010 | A1* | 10/2013 | Lovell | H04L 12/1854 370/390 |
| 2014/0188825 | A1* | 7/2014 | Muthukkaruppan | G06F 16/134 707/694 |

(Continued)

OTHER PUBLICATIONS

"HDFS Architecture Guide", Hadoop, [Online]. [Accessed Sep. 17, 2018]. Retrieved from the Internet: <URL: https://web.archive.org/web/20170321042542/https://hadoop.apache.org/docs/r1.2.1/hdfs_design.html>, 8 pgs.

(Continued)

Primary Examiner — Andrew Lai
Assistant Examiner — Chuong M Nguyen
(74) Attorney, Agent, or Firm — Schwegman Lundberg & Woessner, P.A.

(57) ABSTRACT

Generally discussed herein are systems, devices, and methods for data distribution in a distributed data processing system (DDPS). A device of a distributed data processing system may include a storage device to store data regarding data nodes (DNs), switches, and racks on which the DNs and at least some of the switches reside, and circuitry to receive, from a name node or a client node of the DDPS and coupled to the device, a first communication indicating one or more DNs to which a portion of a file is to be replicated, determine a component in a data path between the client node and one or more of the DNs at which to mirror the portion of the file, and provide a second communication indicating the component at which the data is to be mirrored, one or more of the DNs to receive the portion of the tile, and the corresponding one or more of the racks on which the DNs reside.

15 Claims, 5 Drawing Sheets

(56) References Cited

U.S. PATENT DOCUMENTS

2015/0088827 A1* 3/2015 Xu .................... G06F 3/0605
  707/634
2016/0259813 A1* 9/2016 Krupakaran .......... G06F 16/178
2017/0317892 A1* 11/2017 Tung .................... H04L 49/00

OTHER PUBLICATIONS

Hedlund, Brad, "Understanding Hadoop Clusters and the Network", [Online]. [Accessed Sep. 17, 2018]. Retrieved from the Internet: <URL: https://web.archive.org/web/20110927190925/http://bradhedlund.com/2011/09/10/understanding-hadoop-clusters-and-the-network/>, (Sep. 10, 2011), 21 pgs.

* cited by examiner

DISTRIBUTED PROCESSING NETWORK OPERATIONS

TECHNICAL FIELD

Embodiments generally relate to data processing networks. One or more embodiments regard data distribution in distributed processing networks.

TECHNICAL BACKGROUND

Data distribution operations within a distributed processing cluster can be time consuming. When the data is summoned for processing by the cluster, a bottleneck can be formed while distributing the data from storage to the cluster, such as when a cluster pipelined write is performed, and data travels from a Data Node (DN) to a switch multiple times. Current solutions to reducing the possibility of a bottleneck include using additional hardware resources or more costly hardware resources (e.g., higher bandwidth cables, adding central processing units (CPUs), using custom application specific integrated circuits (ASICs)) or implementing a static solution, such as a static Quality of Service (QoS).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

Discussed herein, are systems and methods directed to more efficiently distributing data on a distributed processing cluster, improving the operation of the system including the cluster, such as a cluster of processors operating using the Hadoop® framework from The Apache Software Foundation of Delaware, United States, USA. The data distribution can include a switch (e.g., a Top of Rack (ToR) switch) to mirror data packets to respective destinations. Such mirroring can improve time and resource efficiency. For example, mirroring on the switch may reduce a total number of hops in data distribution.

Figure 1:
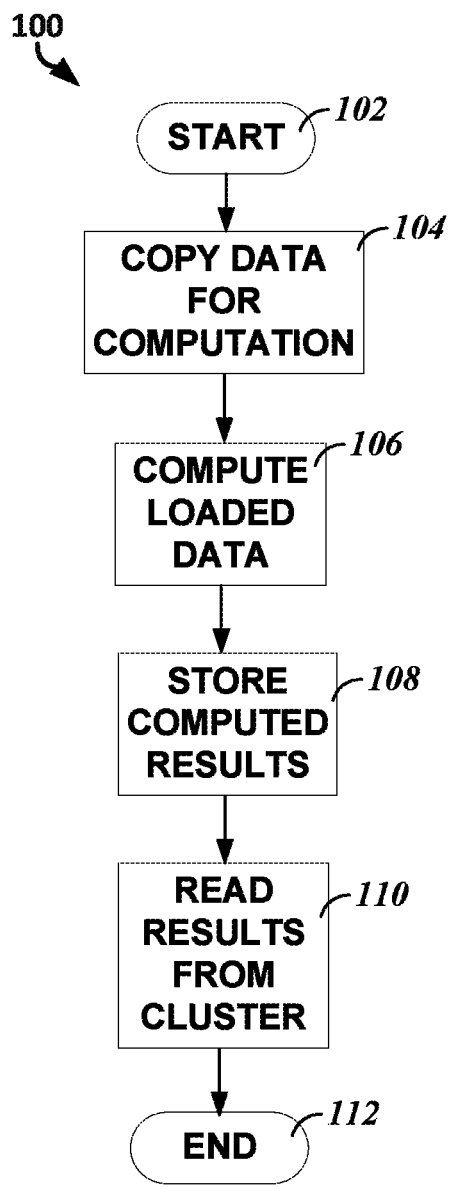
FIG. 1 illustrates, by way of example, a block diagram of an embodiment of a method for a distributed processing cluster workflow.

FIG. 1 illustrates, by way of example, a block diagram of an embodiment of a method 100 for a distributed processing cluster workflow. The method 100 describes, at a high level, operations performed using a distributed data processing system (DDPS). The method 100 as illustrated includes: beginning, at operation 102; copying data for computation, at operation 104; computing loaded data, at operation 106; storing computed results, at operation 108; reading results from cluster, at operation 110; and ending, at operation 112. The operation 104 may include one or more memory write operations. The operation 106 may include performing a parallelization operation, such as may include a MapReduce operation in the example of a Hadoop® cluster. The parallelization operation may split the data into independent chunks which are processed in a parallel manner. The operation 108 may include performing one or more write operations to a memory of the cluster. The operation 110 may include performing one or more read operations from the memory of the cluster.

The operation 104 may include dividing the data for computation into blocks of data that are stored in respective files. The operation 104 may be performed by client 314 (see FIG. 3).

Figure 2:
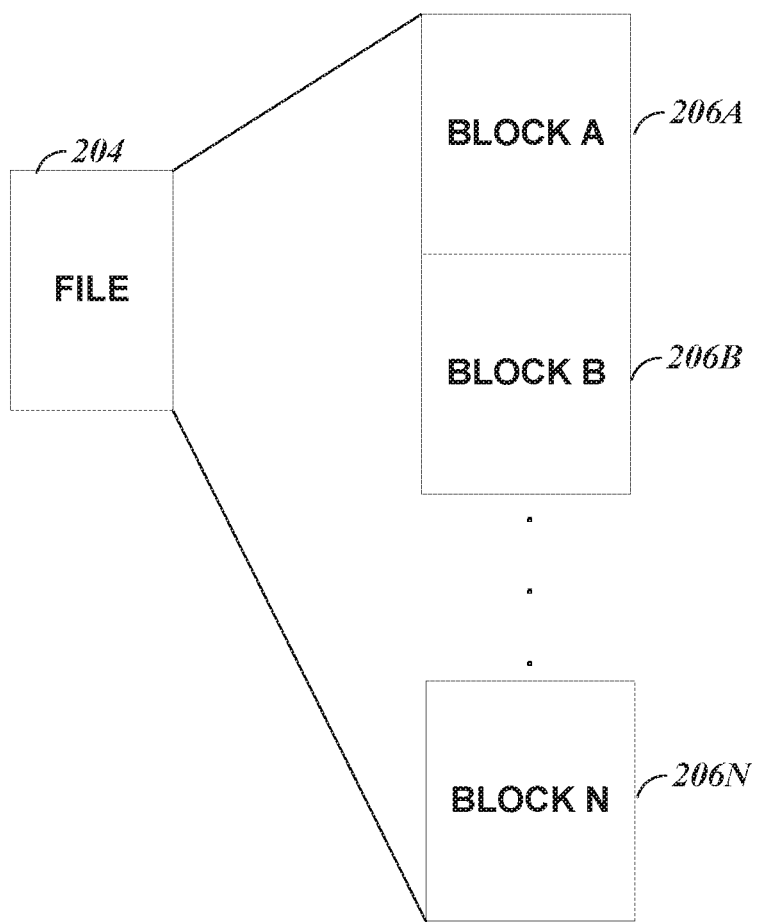
FIG. 2 illustrates, by way of example, a file that is split into respective, non-overlapping N data block files.

FIG. 2 illustrates, by way of example, a file 204 that is split into respective, non-overlapping N data block files 206A, 206B . . . 206N. Each of the files 206A-N may each include a maximum amount of data, such as may include a specified number of bytes of data, such as may include 8 Megabytes (MB), 16 MB, 24 MB, 32 MB, 64 MB, 128 MB, etc., or other amount of data. Each of the files 206A-N may then be replicated to a specified number of nodes of the cluster.

Figure 3:
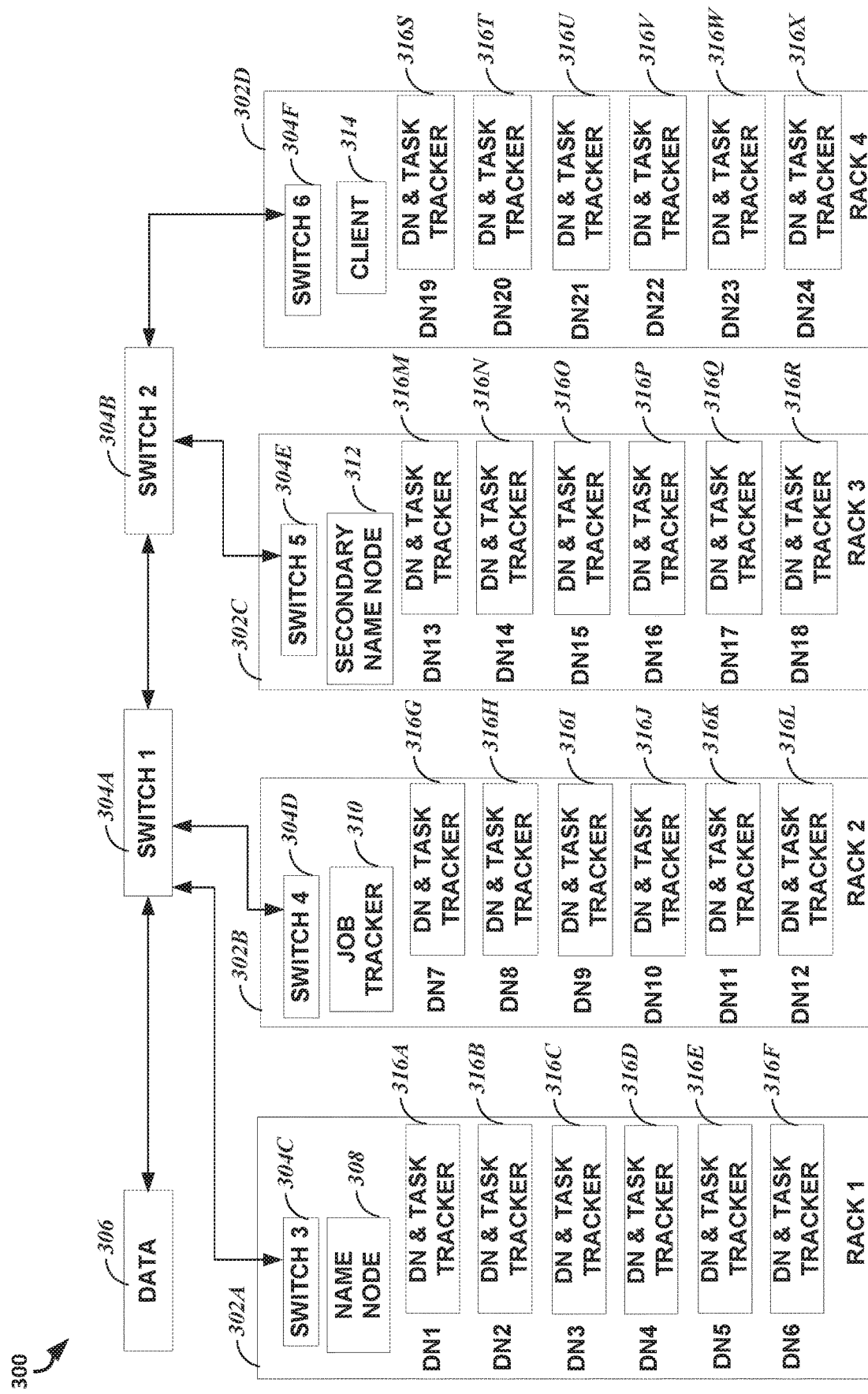
FIG. 3 illustrates, by way of example, a block diagram of an embodiment of a distributed data processing system.

FIG. 3 illustrates, by way of example, a block diagram of an embodiment of a distributed data processing system 300. The system 300 as illustrated includes racks 302A, 302B, 302C, and 302D, switches 304A and 304B, and data 306 on which to operate. The rack 302A as illustrated includes a switch 304C, a name node 308, and a plurality of DNs 316A, 316B, 316C, 316D, 315E, and 316F. The rack 302B as illustrated includes a switch 304D, a job tracker node 310, and a plurality of DNs 316G, 316H, 316I, 316J, 316K, and 316L. The rack 302C as illustrated includes a switch 304E, a secondary name node 312, and a plurality of DNs 316M, 316N, 316O, 316P, 316Q, and 316R. The rack 302D as illustrated includes a switch 304F, a client node 314, and a plurality of DNs 316S, 316T, 316U, 316V, 316W, and 316X.

The racks 302A-D may include a physical mechanical and electric framework to house nodes (e.g., servers, networking devices, computing devices, or the like) and/or other computing equipment. The racks 302A-D may provide equipment placement and orchestration within a facility. Each of the DNs 316A-X, name node 308, job tracker node 310, secondary name node 312, client node 314, and/or switch 304C-F may be mounted in a respective bay in the rack 302A-D.

The switches 304C-F may include a top of rack (ToR) switch. A ToR switch is installed in a rack (not necessarily at the top bay of the rack). The switch 304C-F may include one or more Ethernet ports connected to devices in bays of the rack in which the switch 304C-F resides and to one or more of the switches 304A-B. The switches 304A-B may sometimes be referred to as a leaf or a spine depending on a number and/or topology of other switches. An alternative architecture to the ToR architecture illustrated in the FIGS. includes an end of row architecture, a pod architecture, or other architecture. An end of row architecture includes racks dedicated to providing switching functionality for a row of racks. A pod architecture is a sort of hybrid between the top of rack and end of row architecture.

The data 306 is data provided to the system 300, such as for computing. The data 306 may indicate which operations are to be performed, an application to perform, inputs and outputs for the operations, and/or other data indicating operations to be carried out by the system 300.

The name node 308 comprises a server that manages a file system namespace and provides access control to the files of the file system namespace. The name node 308 is sometimes referred to as the master node or master. The name node 308 stores metadata of the files in the system 300 and tracks the files across the system 300. The data associated with the metadata is stored in the DNs 316A-X. Since files are split into blocks and stored in multiple locations, the blocks that comprise a file and the locations of each of the blocks may each be managed by the name node 308. The name node 308 thus includes data to form files from the blocks. The name node 308 may include random access memory (RAM), such as to help reduce access latency as compared embodiments in which data of the name node 308 is stored in storage devices, such as a hard disk drive or a solid state drive. The name node 308 has access to information indicating which DNs 316A-X are located on which rack 302A-D. The name node 308, in distributing files 206A-N to different nodes may distribute one or more copies of each of the files 206A-N to multiple racks 302A-D, such as to help ensure the data persists through a rack failure.

The job tracker node 310 comprises a node that delegates computing tasks to specific nodes in the system 300. Generally a specific task is delegated to a node that has the data or is in the same rack 302A-D as a DN 316A-X that includes the data stored thereon. Prior to delegation, client applications that produce the data 306 submit tasks to the job tracker node 310. The job tracker node 310 may query the name node 308 to determine the location of data required to perform an operation. The job tracker node 310 may locate task tracker nodes (illustrated as being a part of each of the DNs 316A-X) with compute availability and delegate the task to the task tracker node. The job tracker node 310 may monitor the task tracker, and if insufficient response is provided by the task tracker (e.g., no response, an unintelligible response, a response that is delayed for too long, or the like), the task may be reassigned to a different node. The client application may poll the job tracker node 310 for status updates regarding a submitted job. The job tracker node 310 may provide status updates and/or results of performing the computation to the client application.

The secondary name node 312 may comprise a node that takes checkpoints of the name node 308. The secondary name node 312 merges edit logs with a checkpoint of the name node 308 to update an image of the name node 308. The updated image of the name node 308 produced by the secondary name node 312 may then be used after a next restart, such as to help reduce startup time as compared to an embodiment that does not include a secondary name node 312 and applies the edit logs to the name node 308 at startup time.

The client node 314 may comprise an edge node that may be neither a master nor a slave. The client node 314 may load data into the system 300 (as instructed by the job tracker node 310), submit parallelized tasks to task tracker(s), and retrieve or view results (stored in a file) when the tasks are complete.

The data node 316A-X stores the actual data (e.g., the files 206A-N) of the system 300. The data node 316A-X is sometimes referred to as a slave. The DNs 316A-X are each illustrated as including task trackers. Note that the illustrated configuration is optional. A task tracker may be a separate component from the DN 316A-X. The task tracker may notify the job tracker node 310 whether a task fails to complete, or is complete For example, with reference to FIG. 3, each of the files 206A-N may be replicated to a specified number of DNs (e.g., a specified number of DN1-DN24). The specified number of DNs and/or the maximum size of the files 206A-N may be stored in a configuration file. The configuration file may be stored in the name node 308. The specified number of DNs may be one or greater. For example, in an embodiment in which the specified number of DNs is three, each of the files 206A, 206B . . . 206N is replicated to three of the DNs.

The client node 314 consults the name node 308 through a TCP connection, such as through a standard TCP port 9000, although any other TCP port may be used) and receives a list of DNs 316A-X to which the file 206A is to be replicated. The client node 314 writes the file 206A to a first DN in the list of DNs 316A-X indicated by the name node 308. For example, assume the name node 308 indicated the file 206A is to be replicated to DN1, DN6, and DN14. The client node 314 writes the file 206A to DN1. DN1 then replicates the file 206A to DN5 and DN14 in this example. The DNs to which the file 206A is to be replicated may be provided in metadata of the file 206A. The metadata may indicate the DNs (e.g., DN5 and DN14) and the rack in which the DN resides (e.g., Rack 1 and Rack 3). The same cycle then repeats for each for each of the files 206B-N to replicate the data of the file 204 into the system 300, with the DNs to which the data is replicated being different (generally). Typically, in determining where to copy the file 206A-N, the name node 308 selects two DNs from a same rack and a DN from another rack. In the example, two DNs are from the rack 302A and one DN is from the rack 302C. The number of DNs and racks to which the file 206A-N is respectively copied may be configured in the configuration file.

Before the client node 314 writes the file 206A-N to the DNs 316A-X, it may ensure that the DNs that are to receive a copy of the file 206A-N are ready to receive the file 206A-N. The client node 314 chooses a DN in the list (e.g., block 206A is to be provided to DN1 316A, DN5 316E, and DN14 316N) from the name node 308 and opens a communication connection (e.g., a transmission control protocol (TCP) connection, such as a TCP port 50010 connection, although some operators may choose to use a different port). The DN opens a TCP connection with a next DN in the list, and so on until all DNs in the list are part of a TCP connection. An acknowledgment packet (ACK) is provided in response the TCP connection being created, in instances in which the DN receiving the TCP connection request is ready to receive the data. The last DN in the list provides their ACK to the second-to-last DN in the list, which provides the ACK for the last DN and the second-to-last DN to the third-to-last DN in the list and so on. The ACKS come back to the client node 314 on the same TCP pipeline until the first DN sends a ready message back to the client node 314. The client node 314 may then write the data to the first DN in the list and indicate one or more other DNs to receive the data. The first DN may write the data to the second DN in the list and indicate one or more other DNs to receive the data, and so on until the data is replicated to all DNs in the list.

In the example in which the client node 314 is to write the file 206A to the DN1, DN5, and DN14, the client node 314 opens a TCP connection with the DN1 and indicates that DN5 and DN14 are also to receive the data, the DN1 opens a TCP connection with the DN5 and indicates that DN 14 is to receive the data, and DN5 opens a TCP connection with DN14. DN14 provides an ACK to DN5, which provides an ACK to DN1 indicating that DN5 and DN14 are ready. Then DN1 provides the ready message to the client node 314.

When the client node 314 is writing the file 204 to the system 300, the file 204 is first written locally to a memory of the client node 314. The client node 314 then receives the DN list from the name node 308. The first DN (DN1) may start receiving the data of the file 206A-N in smaller chunks than the entirety of the file (e.g., a number of bytes, kilobytes, MB, etc.). The first DN may write that portion to its local memory (e.g., cache, repository, or other memory) and transfer that smaller chunk to the second DN (DN5 in this example) in the list. The second DN does the same, writing the smaller chunk locally and forwarding the smaller chunk (over the TCP connection) to the third DN (DN14 in this example) and so on until all DNs in the list have received and written the smaller chunk locally. Thus, a DN can be receiving data from the previous DN in the pipeline (as defined by the list from the name node 308) and, at the same time, forwarding data to the next DN in the pipeline. Thus, the data may be pipelined to the DNs.

During the pipelined write, as mentioned above, the data has to travel from a DN to the switch 304A-C two times more than if it is mirrored in the switch 304C and copied to the respective DNs (e.g., DN1, DN5 and DN14 in this example). With reference to the example discussed where the file 206A is copied to DN1, DN5, and DN14, in replicating the data to the three DNs of this example, the client node 314 first copies the data to DN1. The file may be provided on the path from the client node 314, to the switch 304F, to the switch 304B, to the switch 304A, to the switch 304C, and finally to DN1 (the DN 316A). The DN1 copies the file 206A to DN5 (the DN 316E). To accomplish this, the file 206A may be provided on the data path from the DN1 to the switch 304C and then from the switch 304C to the DN5. The DN5 then copies the file 206A to DN14. To accomplish this, the file 206A may be provided on the data path from the DN5 to the switch 304C, from the switch 304C to the switch 304A, from the switch 304A to the switch 304B, from the switch 304B to the switch 304E, and from the switch 304E to the DN14 (the DN 316N).

Note that in the data replication process just described, the file 204A is provided to the switch 304C three times. This number may be reduced by mirroring the data on the switch 304C (in this example) and providing the data to the DN1 and DN5 from the switch 304C and also to the switch 304A (on the data path to DN14) without having to provide the same data to the switch 304C multiple times. Mirroring the data may include opening a TCP connection with all receivers (DN1, DN5, and DN14 in this example) and providing the same file 204A through a TCP connection to all the receivers.

In mirroring the data at the switch 304C in the example discussed, the client node 314 provides the file 206A to the switch 304F, the switch 304F provides the file 206A to the switch 304B, the switch 304B provides the file 206A to the switch 304A, and the switch 304A provides the file 206A to the switch 304C. The switch 304C mirrors the file 206A to DN1, DN5, and to DN14. The switch 304C may provide the file 206A directly to the DN1 and DN5, thus eliminating the need for the DN1 to provide the file 206A to the switch 304C as in the example preciously discussed. In mirroring the file 206A to the DN14, the DN5 no longer needs to provide the file 206A to the switch 304C as in the example previously discussed. These efficiencies reduce the number of data transfers, and/or the throughput efficiency of the system 300 and/or an amount of time required to perform the data replication. Such a mirroring of the data alters a fundamental way in which data distribution is performed in distributed processing systems. A similar mirroring may be done with the remaining files 206B-N. The mirroring may be indicated by the client node 314. The client node 314 may receive the mirroring data from a controller 430 (see FIG. 4) that is part of or external to the system 300.

Figure 4:
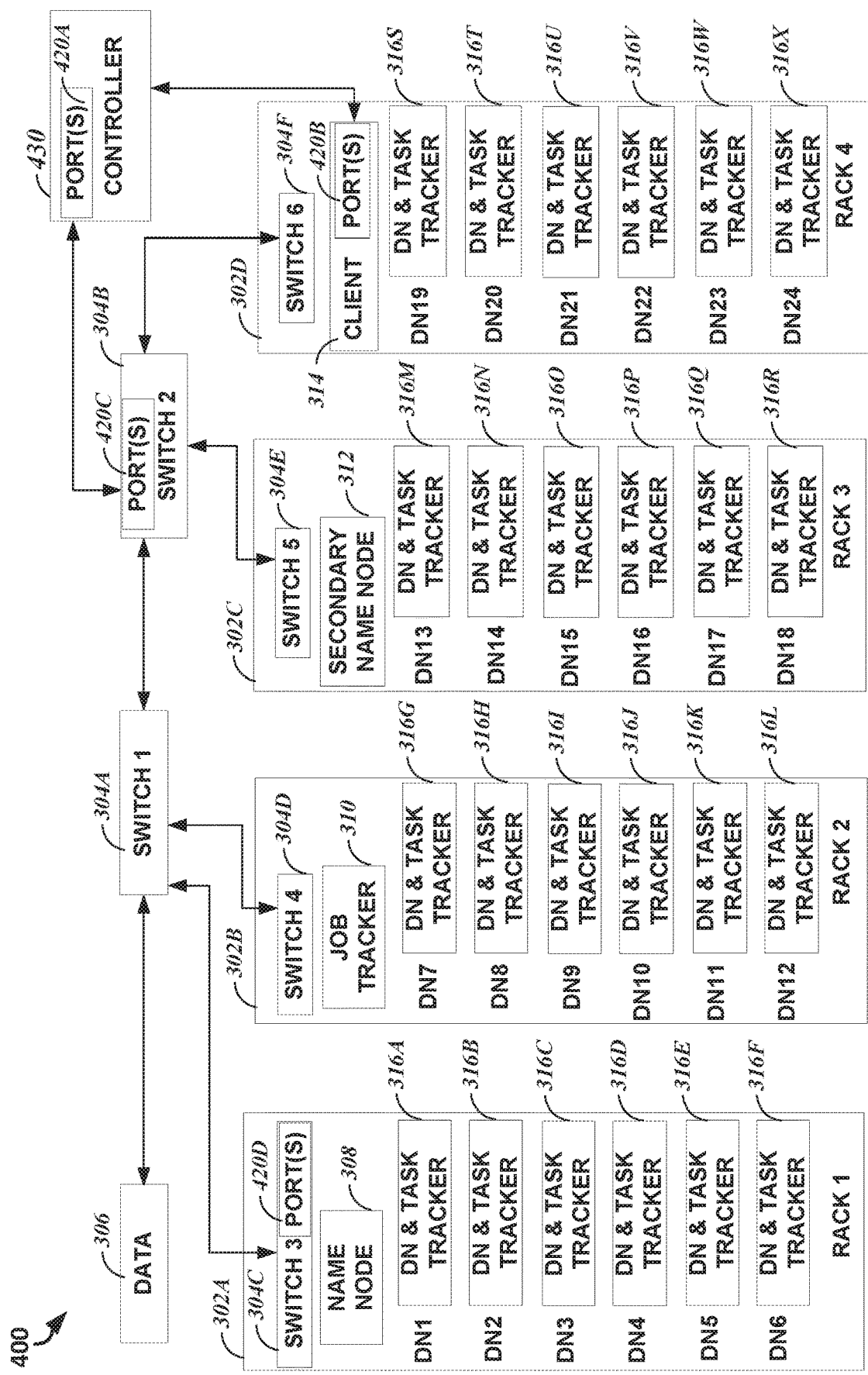
FIG. 4 illustrates, by way of example, a block diagram of an embodiment of a distributed processing system with increased efficiency in data distribution.

FIG. 4 illustrates, by way of example, a block diagram of an embodiment of a distributed processing system 400 with increased efficiency in data distribution. The system 400 as illustrated is similar to the system 300 with the system 400 including a controller 430 coupled between the switch 304B and the client node 314.

The controller 430 may include hardware, software, firmware, or a combination thereof. The controller 430 may include circuitry, such as one or more transistors, resistors, inductors, capacitors, diodes, logic gates, regulators, buffers, memories, ports, switches, multiplexers, oscillators, or the like. The controller 430 may include a central processing unit (CPU), graphics processing unit (GPU), field programmable gate array (FPGA), and/or a state machine configured to perform operations of the controller 430.

In one or more embodiments, the controller 430 may include an application programming interface (API). The controller 430 (and the system 400) may be programmatically initialized, controlled, changed, or its behavior otherwise managed through the API. Such an API may help provide a software-defined networking (SDN) solution to the data distribution and replication problems discussed herein. In one or more embodiments, the API may include a representational state transfer (REST) interface.

The controller 430 may receive (e.g., from the name node 308 or the client node 314) the list of DNs to which the respective files 206A-N are to be replicated. The controller 430 may determine a component (e.g., a DN, switch, or other component of the system 400) in a pipeline of components used multiple times in the replication process. The controller 430 may determine a pipeline path for replicating the file 206A-N. In the example in which the file 206A is replicated to the DN1, DN5, and DN14, the pipeline path includes:
client node 314→switch 304F→switch 304B→switch 304A→switch 304C→DN 316A→switch 304C→DN 316E→switch 304C→switch 304A→switch 30413→switch 304E→DN 316N.

The controller 430 can determine the pipeline path and sum the number of times each component appears in the determined pipeline path. In the example the switches 304A and 304B appear twice (a copy of the file 206A will travel through the switches 306A and 306B twice), and the switch 304C appears three times. The remaining components appear only once in the pipeline path. The controller 430 may sum a number of times each component appears in the pipeline path. The component corresponding to the largest sum (or a component corresponding to the largest sum) may be chosen, by the controller 430, to mirror the file to be replicated using the pipeline path.

The controller 430 may indicate to the client node 314 the component that is to mirror the file and the nodes which are to receive the file. The client node 314 may then initiate the replication (by determining whether the DNs to receive the file are available and/or performing one or more other operations involved in performing the replication previously discussed). The replication may include the component to mirror the file opening a connection with each of the DNs to receive the file. The connection with the DNs may include a mirror operation in which one sender provides the same data to multiple receivers. The connection may include a TCP connection.

In embodiments in which each of the files 206A-N is replicated to three DNs, two DNs on a first rack, and one DN on a second, different rack, the switch (e.g., top of rack (ToR) switch 304C) in the first rack may be chosen as the component to mirror the file 206A-N and provide it to the DNs. The controller 430 may know an address (e.g., an internet protocol (IP) address) of each of the switches of the racks and the DNs in each rack. In response to receiving the list, such as the list shown in Table 1 below, the controller 430 may determine a rack that appears the most often for each of the files and look up the switch associated with that rack. That switch may be chosen to mirror the data to the DNs.

TABLE 1

Metadata from the Name Node

| FILE 206A | RACK 1 - DN1 | RACK 1 - DN5 | RACK 3 - DN14 |
|---|---|---|---|
| FILE 206B | RACK 2 - DN10 | RACK 3 - DN13 | RACK 3 - DN15 |
| ... | ... | ... | ... |
| FILE 206N | RACK 1 - DN2 | RACK 2 - DN9 | RACK 2 - DN11 |

The controller 430 may, for each of the files 206A-N, determine the rack that appears most often in the rows. For the file 206A, rack 1 appears the most often in Table 1. For the file 206B, rack 3 appears the most often in Table 1. For the file 206N, rack 2 appears the most often in Table 1. The controller 430 may look up the switch associated with the rack that appears most often in the metadata for each of the files and indicate the switch to the client node 314. The switch name and/or address may be provided with an indication of the file 206A-N and the DNs which are to receive the file may be provided from the controller 430 to the client node 314. The client node 314 may then initiate the replication process. Each of the switches 304A-F may be programmable and/or operable to mirror a file to a plurality of receiving devices.

Different configurations may be specified in the configuration tile, such as by altering a number of DNs to which each of the files 206A-N is to be replicated and/or a number of different racks to which each the files 206A-N is to be replicated. In such configurations, the controller 430 may sum just the racks in the metadata (as previously discussed) or may determine the pipeline path and sum a number of times each component appears in the pipeline path (as previously discussed).

In one or more embodiments, the data may be mirrored at multiple components, such as to help further reduce the number of times the file is provided to the same component multiple times. Consider the example in which the file 206A is to be replicated to DN1, DN5, and DN14. The client node 314 may indicate to the switch 304B that the file 206A is to be provided to rack 3 (the rack 302C) and rack 1 (the rack 302A), The switch 304B may mirror the file 204A to the switch 304A and the switch 304C. The switch 304B may indicate the DNs to which the file 206A is to be replicated. The switch 304A may then provide the file 206A to the switch 304C and the switch 304E. The switch 304C may mirror the file 204C to the DN1 and DN5 and the switch 304E may provide the file 206A to the DN14. Such a configuration may further reduce a number of "hops" and/or an amount of time a file replication process consumes increasing an overall throughput of system 400.

One or more of the switch 304A-F, the name node 308, the job tracker node 310, the secondary name node 312, the client node 314, and the DN(s) 316A-X may include one or more input and/or output port(s) 420A, 420B, 420C, and/or 420D. Only the switch 304C, switch 304B, controller 430, and the client node 314 are illustrated as including port(s) so as to not obscure the view of other components in FIG. 4. Notwithstanding, any of the switches 304A-F, the name node 308, the job tracker node 310, the secondary name node 312, the client node 314, and the DN(s) 316A-X may include one or more input and/or output port(s) 420A, 420B, 420C, and/or 420D. The port(s) 420A-D serve as an interface between the device on which they reside and a peripheral device. The controller 430 might have just one physical port that is connected to other switch management ports through a switch, rather than the controller 430 having one port per switch (304A-F). In some embodiments, a port is a designated receptacle to which a plug or cable may connect. Conductors where the port and cable/plug connect may provide a medium through which to transfer signals.

Figure 5:
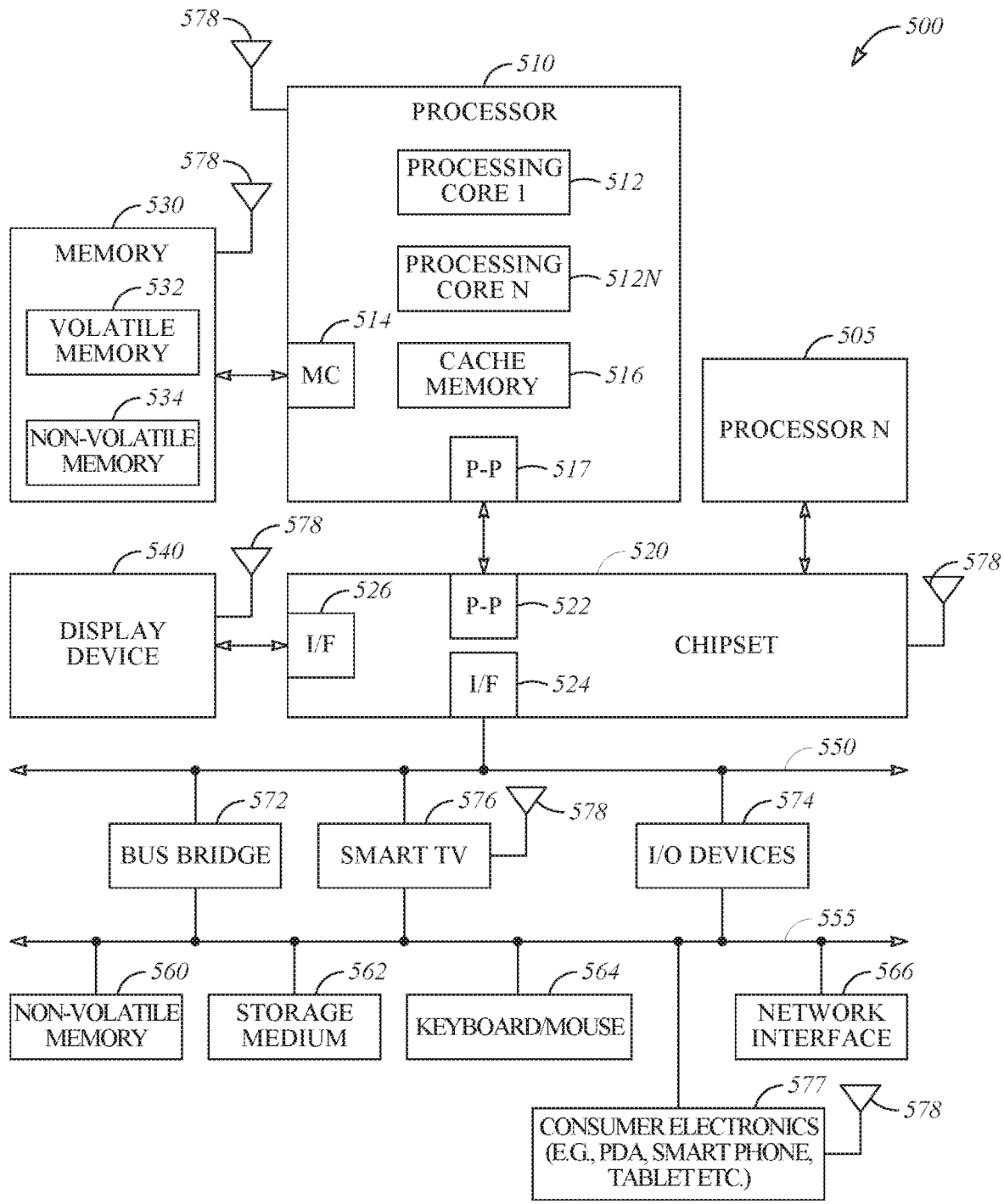
FIG. 5 illustrates by way of example, a block diagram of an embodiment of a system.

FIG. 5 illustrates, by way of example, a block diagram of an embodiment of a system 500. In one or more embodiments, the system 500 includes one or more components that can be included in the switch 304A-F, the name node 308, the job tracker node 310, the secondary name node 312, the client node 314, the DN(s) 316A-X, and/or the rack(s) 302A-D.

In one embodiment, processor 510 has one or more processing cores 512 and 512N, where 512N represents the Nth processing core inside processor 510 where N is a positive integer. In one embodiment, system 500 includes multiple processors including 510 and 505, where processor 505 has logic similar or identical to the logic of processor 510. In some embodiments, processing core 512 includes, but is not limited to, pre-fetch logic to fetch instructions, decode logic to decode the instructions, execution logic to execute instructions and the like. In some embodiments, processor 510 has a cache memory 516 to cache instructions and/or data for system 500. Cache memory 516 may be organized into a hierarchal structure including one or more levels of cache memory.

In some embodiments, processor 510 includes a memory controller 514, which is operable to perform functions that enable the processor 510 to access and communicate with memory 530 that includes a volatile memory 532 and/or a non-volatile memory 534. In some embodiments, processor 510 is coupled with memory 530 and chipset 520. Processor 510 may also be coupled to a wireless antenna 578 to communicate with any device configured to transmit and/or receive wireless signals. In one embodiment, the wireless antenna interface 578 operates in accordance with, but is not limited to, the IEEE 802.11 standard and its related family, Home Plug AV (HPAV), Ultra Wide Band (UWB), Bluetooth, WiMax, or any form of wireless communication protocol.

In some embodiments, volatile memory 532 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 534 includes, but is not limited to, flash memory, phase change memory (PCM), read-only memory (ROM), electrically erasable programmable read-only memory (EEPROM), or any other type of non-volatile memory device.

Memory 530 stores information and instructions to be executed by processor 510. In one embodiment, memory 530 may also store temporary variables or other intermediate information while processor 510 is executing instructions. The memory 530 is an example of a machine-readable medium. While a machine-readable medium may include a single medium, the term "machine-readable medium" may include a single medium or multiple media (e.g., a centralized or distributed database, and/or associated caches and servers).

The term "machine-readable medium" may include any medium that is capable of storing, encoding, or carrying instructions for execution by a machine (e.g., the controller 430, switch 304A-D, name node 308, job tracker node 310, secondary name node 312, client node 314, or the like) and that cause the machine to perform any one or more of the techniques of the present disclosure, or that is capable of storing, encoding or carrying data structures used by or associated with such instructions. In other words, the various circuitry discussed herein can include instructions and can therefore be termed a machine-readable medium in the context of various embodiments. Other non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In the illustrated embodiment, chipset 520 connects with processor 510 via Point-to-Point (PtP or P-P) interfaces 517 and 522. Chipset 520 enables processor 510 to connect to other elements in system 500. In some embodiments of the invention, interfaces 517 and 522 operate in accordance with a PtP communication protocol such as the Intel® QuickPath Interconnect (QPI) or the like. In other embodiments, a different interconnect may be used.

In some embodiments, chipset 520 is operable to communicate with processor 510, 505N, display device 540, and other devices. Chipset 520 may also be coupled to a wireless antenna 578 to communicate with any device configured to transmit and/or receive wireless signals.

Chipset 520 connects to display device 540 via interface 526. Display device 540 may be, for example, a liquid crystal display (LCD), a plasma display, cathode ray tube (CRT) display, or any other form of visual display device. In some embodiments of the invention, processor 510 and chipset 520 are merged into a single SOC in addition, chipset 520 connects to one or more buses 550 and 555 that interconnect various elements 574, 560, 562, 564, and 566. Buses 550 and 555 may be interconnected together via a bus bridge 572. In one embodiment, chipset 520 couples with a non-volatile memory 560, a mass storage device(s) 562, a keyboard/mouse 564, and a network interface 566 via interface 524 and/or 504, etc.

In one embodiment, mass storage device 562 includes, but is not limited to, a solid state drive, a hard disk drive, a universal serial bus flash memory drive, or any other form of computer data storage medium. In one embodiment, network interface 566 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the components shown in FIG. 5 are depicted as separate blocks within the system 500, the functions performed by some of these blocks may be integrated within a single semiconductor circuit or may be implemented using two or more separate integrated circuits. For example, although cache memory 516 is depicted as a separate block within processor 510, cache memory 516 (or selected aspects of 516) can be incorporated into processor core 512.

EXAMPLES AND NOTES

The present subject matter may be described by way of several examples.

Example 1 can include a device of a distributed data processing system, the device comprising a storage device to store data regarding data nodes (DNs), switches, and racks on which the DNs and at least some of the switches reside; and circuitry to receive, from a name node or a client node of the DDPS and coupled to the device, a first communication indicating one or more DNs to which a portion of a file is to be replicated, determine a component in a data path between the client node and one or more of the DNs at which to mirror the portion of the file, and provide a second communication indicating the component at which the data is to be mirrored, one or more of the DNs to receive the portion of the file, and the corresponding one or more of the racks on which the DNs reside.

In Example 2, Example 1 may further include, wherein the first communication further indicates the rack of the racks on which each of the DNs listed in the first communication resides.

In Example 3, at least one of Examples 1-2 may further include circuitry is further to determine a pipeline path used to replicate the portion of the file to the DNs listed in the first communication, wherein the determination of the component at which to mirror the portion of the file is based on the determined pipeline path.

In Example 4, Example 3 may further include, wherein the circuitry is further to determine a number of times each component in the pipeline path appears in the pipeline path, wherein the determined component is a component determined to appear a most number of times in the pipeline path.

In Example 5, at least one of Examples 1-4 may further include, wherein the circuitry is further to determine which rack of the corresponding racks occurs in the first communication a most number of times.

In Example 6, Example 5 may further include, wherein the circuitry is further to determine, by reading from the storage device, a switch on the rack determined to occur in the metadata the most number of times as a determined switch, wherein the component at which to mirror the portion of the file is the determined switch.

In Example 7, at least one of Examples 1-6 may further include, wherein the metadata indicates three or more DNs to which to replicate the portion of the file, on which of at least two of the racks each of the three or more DNs resides.

In Example 8, Example 7 may further include, wherein the number of DNs is three.

In Example 9, at least one of Examples 1-8 may further include a port coupled to the client node and a port coupled to a switch between the client node and the name node.

In Example 10 a programmable switch of a first rack of a distributed data processing system (DDPS) includes a plurality of ports, at least one of the ports respectively coupled to a second switch external to the first rack, and respective data nodes (DNs) of the first rack, and circuitry to receive, from a port of the plurality of ports, a communication indicating first and second DNs of the first rack and a third DN of a second rack of the DDPS to which to replicate a portion of a file, open a connection to each of the first, second, and third DNs on respective ports of the plurality of ports, and provide the portion of the file using the respective ports.

In Example 11, Example 10 may further include, wherein the circuitry is to mirror the portion of the file on the opened connections.

In Example 12, at least one of Examples 10-11 may further include, wherein the connection to each of the first, second, and third DNs comprises a transmission control protocol (TCP) connection.

In Example 13, at least one of Examples 10-12 may further include, wherein the switch comprises a top of rack (ToR) switch.

In Example 14, at least one of Examples 10-13 may further include, wherein the communication indicates the rack of the DDPS on which each of the DNs listed in the communication resides.

Example 15 includes a method performed by controller circuitry of a device of a distributed data processing system (DDPS), the method comprising receiving, from a name node or a client node of the DDPS and coupled to the device, a first communication indicating one or more DNs to which a portion of a file is to be replicated, determining a component in a data path between the client node and one or more of the DNs at which to mirror the portion of the file, and providing a second communication indicating the component at which the data is to be mirrored, DNs to receive the portion of the file, and the corresponding racks on which the DNs reside.

In Example 16, Example 15 may further include, wherein the first communication further indicates the rack of the racks on which each of the DNs listed in the first communication resides.

In Example 17, at least one of Examples 15-16 may further include determining a pipeline path used to replicate the portion of the file to the DNs, wherein the determination of the component at which to mirror the portion of the file as a determined component is based on the determined pipeline path.

In Example 18, Example 17 may further include determining a number of times each component in the pipeline path appears in the pipeline path, wherein determination of the component at which to mirror the portion of the file is the component determined to appear a most number of times in the pipeline path.

In Example 19, at least one of Examples 15-18 may further include determining which rack of the corresponding racks occurs in the first communication a most number of times.

In Example 20, Example 19 may further include determining, by reading from the storage device, a switch on the rack determined to occur in the metadata the most number of times, wherein the component at which to mirror the portion of the file is the determined switch.

In Example 21, at least one of Examples 15-20 may further include, wherein the metadata indicates three or more DNs to which to replicate the portion of the file, on which rack each of the three or more DNs resides, and the racks include two or more racks.

In Example 22, Example 21 may further include, wherein the number of DNs is three and the number of racks is two.

Example 23 includes a method performed by circuitry of a programmable switch of a first rack of a distributed data processing system (DDPS), the method comprising receiving, from a port of a plurality of ports of the switch, a communication indicating first and second DNs of the first rack and a third DN of a second rack of the DDPS to which to replicate a portion of a file, opening a connection to each of the first, second, and third DNs on respective ports of the plurality of ports, and providing the portion of the file using the respective ports.

In Example 24, Example 23 may further include mirroring the porn on of the file on the opened connections.

In Example 25, at least one of Examples 23-24 may further include, wherein the connection to each of the first, second, and third DNs is a transmission control protocol (TCP) connection.

In Example 26, at least one of Examples 23-25 may further include, wherein the switch is a top of rack (ToR) switch.

In Example 27, at least one of Examples 23-26 may further include, wherein the communication indicates the rack of the DDPS on which each of the DNs listed in the communication resides.

Example 28 includes at least one non-transitory machine-readable medium including instructions that, when executed by a machine, cause the machine to perform operations comprising receiving, from a name node or a client node of a distributed data processing system (DIPS) and coupled to the machine, a first communication indicating one or more data nodes (DNs) to which a portion of a file is to be replicated, determining a component in a data path between the client node and one or more of the DNs at which to mirror the portion of the file, and providing a second communication indicating the component at which the data is to be mirrored, one or more of the DNs to receive the portion of the file, and the corresponding one or more of the racks on which the DNs reside.

In Example 29, Example 28 may include, wherein the first communication further indicates the rack of the racks on which each of the DNs listed in the first communication resides.

In Example 30, at least one of Examples 28-29 may further include determining a pipeline path used to replicate the portion of the file to the DNs, and wherein the determination of the component at which to mirror the portion of the file is based on the determined pipeline path.

In Example 31, Example 30 may further include, wherein the operations further comprise determining a number of times each component in the pipeline path appears in the pipeline path, and wherein the determination of the component at which to mirror the portion of the file is the component determined to appear a most number of times in the pipeline path.

In Example 32, at least one of Examples 28-31 may further include, wherein the operations further comprise determining which rack of the corresponding racks occurs in the first communication a most number of times.

In Example 33, Example 32 may further include, wherein the operations further comprise determining, by reading from the storage device, a switch on the rack determined to occur in the metadata the most number of times, and wherein the component at which to mirror the portion of the file is the determined switch.

In Example 34, at least one of Examples 28-33 may further include, wherein the metadata indicates three or more DNs to which to replicate the portion of the file, on which rack each of the three or more DNs resides, and the racks include two or more racks.

In Example 35, Example 34 may further include, wherein the number of DNs is three and the number of racks is two.

Example 36 includes a non-transitory machine-readable medium including instructions that, when executed by a programmable switch of a first rack of a distributed data processing system (DDPS), cause the programmable switch to perform operations comprising receiving a communication indicating first and second DNs of the first rack and a third DN of a second rack of the DDPS to which to replicate a portion of a file, opening a connection to each of the first, second, and third DNs on respective ports of the plurality of ports, and providing the portion of the file using the respective ports.

In Example 37, Example 36 may further include, wherein the operations further comprise mirroring the portion of the file on the opened connections.

In Example 38, at least one of Examples 36-37 may further include, wherein the connection to each of the first, second, and third DNs is a transmission control protocol (TCP) connection.

In Example 39, at least one of Examples 36-38 may further include, wherein the switch is a top of rack (ToR) switch.

In Example 40, at least one of Examples 36-39, wherein the communication indicates the rack of the DDPS on which each of the DNs listed in the communication resides.

Example 41 includes a distributed data processing system (DDPS), the system comprising a client node, a name node, a plurality of data nodes (DNs), switches coupling the DNs, client node, and name node a controller device comprising a storage device to store data regarding the DNs, switches, and racks on which the DNs and at least some of the switches reside, and first circuitry to receive, from a name node or a client node of the DDPS and coupled to the device, a first communication indicating one or more DNs to which a portion of a file is to be replicated, determine a component in a data path between the client node and one or more of the DNs at which to mirror the portion of the file, and provide a second communication indicating the component at which the data is to be mirrored, one or more of the DNs to receive the portion of the tile, and one or more of the corresponding racks on which the DNs reside.

In Example 42, the Example of 41 may further include, wherein a switch of the switches is programmable an on a first rack of the racks, the switch further comprises a programmable switch of a first rack of the racks, the switch comprising a plurality of ports, a port of the plurality ports respectively coupled to a second switch of the switches external to the first rack, and respective DNs of the first rack, and second circuitry to receive, from a port of the plurality of ports, the second communication, the second communication indicating first and second DNs of the first rack and a third DN of a second rack of the DDPS to which to replicate a portion of a file, open a connection to each of the first, second, and third DNs on respective ports of the plurality of ports, and provide the portion of the file using the respective ports.

In Example 43, at least one of Examples 41-42 may further include, wherein the first communication further indicates the rack of the racks on which each of the DNs listed in the first communication resides.

In Example 44, at least one of Examples 41-43 may further include, wherein the first circuitry is further to determine a pipeline path used to replicate the portion of the file to the DNs, wherein the determination of the component at which to mirror the portion of the file as a determined component is based on the determined pipeline path.

In Example 45, Example 44 may further include, wherein the first circuitry is further to determine a number of times each component in the pipeline path appears in the pipeline path, wherein determination of the component at which to mirror the portion of the file as a determined component is the component determined to appear a most number of times in the pipeline path.

In Example 46, at least one of Examples 41-45 may further include, wherein the first circuitry is further to determine which rack of the corresponding racks occurs in the first communication a most number of times.

In Example 47, Example 46 may further include, wherein the first circuitry is further to determine, by reading from the storage device, a switch on the rack determined to occur in the metadata the most number of times, and wherein the component at which to mirror the portion of the file is the determined switch.

In Example 48, at least one of Examples 41-47 may further include, wherein the metadata indicates three or more DNs to which to replicate the portion of the file, on which rack each of the three or more DNs resides, and the racks include two or more racks.

In Example 49, Example 48 may further include, wherein the number of DNs is three and the number of racks is two.

In Example 50, at least one of Examples 41-49 may further include a first port coupled to the client node and a second port coupled to a switch between the client node and the name node.

In Example 51, at least one of Examples 42-50 may further include, wherein the second circuitry is to mirror the portion of the file on the opened connections.

In Example 52, at least one of Examples 42-51 may further include, wherein the connection to each of the first, second, and third DNs is a transmission control protocol (TCP) connection.

In Example 53, at least one of Examples 42-52 may further include, wherein the switch is a top of rack (ToR) switch.

In Example 54, at least one of Examples 42-53 may further include, wherein the communication indicates the rack of the DDPS on which each of the DNs listed in the communication resides.

Each of these non-limiting examples can stand on its own, or can be combined in various permutations or combinations with one or more of the other examples. Non-transitory merely means that the medium comprises a form of tangible media.

The above detailed description includes references to the accompanying drawings, which form a part of the detailed description. The drawings show, by way of illustration, specific embodiments in which methods, apparatuses, and systems discussed herein can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." in this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A device of a distributed data processing system (DDPS), the device comprising:
   a storage device to store data regarding components including data nodes (DNs), switches, and racks on which the DNs and at least some of the switches reside; and
   circuity to:
   receive, from one of a name node and a client node of the DDPS and coupled to the device, a first communication indicating two or more DNs to which a portion of a file is to be simultaneously provided;
   determine a pipeline path to be used to provide the portion of the file to the DNs listed in the first communication, the pipeline path indicating the switches, racks, and DNs of the DDPS through which the portion of the file will propagate to get to the DNs;
   determine a number of times each component in the pipeline path appears in the pipeline path;
   mirror, by opening simultaneous communication channels with the two or more DNs, the portion of the file at the component determined to appear a most number of times in the pipeline path;
   provide a second communication indicating the determined component at which the portion of the file is to be mirrored, the two or more of the DNs to receive the portion of the file, and the corresponding one or more of the racks on which the one or more of the DNs to receive the portion of the file reside; and
   cause the determined component to simultaneously provide the portion of the file over the opened simultaneous communication channels to the components immediately downstream of the determined component in the pipeline path.

2. The device of claim 1, wherein the first communication further indicates a rack of the corresponding one or more of the racks on which each of the DNs listed in the first communication resides.

3. The device of claim 1, wherein the circuitry is further to:
   determine which rack of the corresponding one or more of the racks occurs in the first communication a most number of times.

4. The device of claim 3, wherein the circuitry is further to:
   determine, by reading from the storage device, a switch on the rack of the corresponding one or more of the racks determined to occur in the first communication the most number of times as a determined switch,
   wherein the component at which to mirror the portion of the file is the determined switch.

5. The device of claim 1, wherein the first communication indicates three or more DNs to which to replicate the portion of the file, on which of at least two of the racks each of the three or more DNs resides.

6. The device of claim 5, wherein the number of DNs is three.

7. The device of claim 1, further comprising a port coupled to the client node and a port coupled to a switch between the client node and the name node.

8. A programmable switch of a first rack of a distributed data processing system (DDPS), the switch comprising:
   a plurality of ports, at least one of the ports respectively coupled to a second switch external to the first rack and respective data nodes (DNs) of the first rack; and
   circuitry to:
   receive, from a port of the plurality of ports, a communication indicating first and second DNs of the first rack and a third DN of a second rack of the DDPS to which to provide a portion of a file;
   open simultaneous connections to at least two of the first, second, and third DNs on two or more ports of the plurality of ports, the switch determined to appear a most number of times in a pipeline path, the pipeline path indicating switches, racks, and DNs of the DDPS through which the portion of the of the file will propagate to get to the DNs; and
   mirror the portion of the file to components immediately downstream of the switch in the pipeline path using the ports by causing the portion of the file to be simultaneously provided over the two or more ports of the plurality of ports.

9. The switch of claim 8, wherein the connection to at least two of the first, second, and third DNs comprises a transmission control protocol (TCP) connection.

10. The switch of claim 8, wherein the switch comprises a top of rack (ToR) switch.

11. The switch of claim 8, wherein the communication indicates the rack of the DDPS on which each of the DNs listed in the communication resides.

12. A distributed data processing system (DDPS), the system comprising:
   a client node;
   a name node;
   a plurality of data nodes (Dns);
   switches coupling the DNs, client node, and name node;
   a controller device comprising:
   a storage device to store data regarding the DNs, the switches, and racks on which the DNs and at least some of the switches reside; and circuity to:
receive, from one of a name node and a client node of the DDPS and coupled to the device, a first communication indicating two or more DNs to which a portion of a file is to be simultaneously provided;
determine a pipeline path to be used to provide the portion of the file to the DNs listed in the first communication, the pipeline path indicating the switches, racks, and DNs of the DDPS through which the portion of the file will propagate to get to the DNs;
determine a number of times each component in the pipeline path appears in the pipeline path;
mirror, by opening simultaneous communication channels with the two or more DNs, the portion of the file at the component determined to appear a most number of times in the pipeline path;
provide a second communication indicating the determined component at which the portion of the file is to be mirrored, the two or more of the DNs to receive the portion of the file, and one or more of the corresponding racks on which the DNs reside; and
cause the determined component to simultaneously provide the portion of the file over the opened simultaneous communication channels to the components immediately downstream of the determined component in the pipeline path.

13. The system of claim 12, wherein a switch of the switches is programmable and on a first rack of the racks, the programmable switch further comprises:

a plurality of ports, a port of the plurality ports respectively coupled to a second switch of the switches external to the first rack, and respective DNs of the first rack; and
second circuitry to:
receive, from a port of the plurality of ports, the second communication, the second communication indicating first and second DNs of the first rack and a third DN of a second rack of the DDPS to which to provide the portion of the file;
open a connection to each of the first, second, and third DNs on one or more ports of the plurality of ports; and
provide the portion of the file using the one or more ports.

14. The system of claim 12, wherein the first communication further indicates a rack of the corresponding one or more of the racks on which each of the DNs listed in the first communication resides.

15. The system of claim 12, wherein the circuitry is further to:
determine which rack of the corresponding racks occurs in the first communication a most number of times;
determine, by reading from the storage device, a switch on the rack determined to occur in the first communication the most number of times; and
wherein the component at which to mirror the portion of the file is the determined switch.

* * * * *